Jan. 18, 1927.
L. C. SWACKER
1,615,181
METER LOCK COCK
Filed July 31, 1925  2 Sheets-Sheet 1
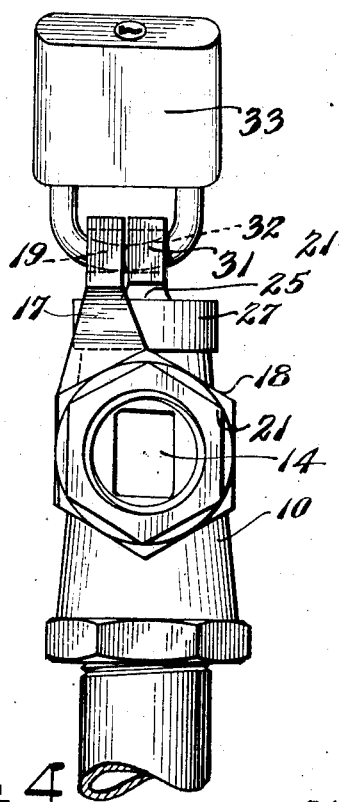
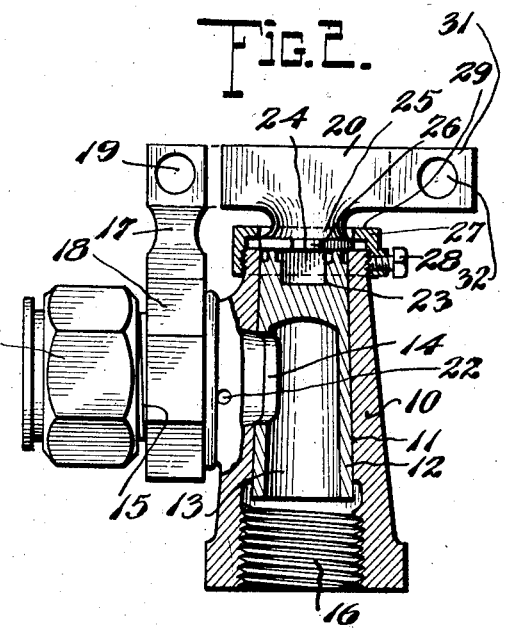
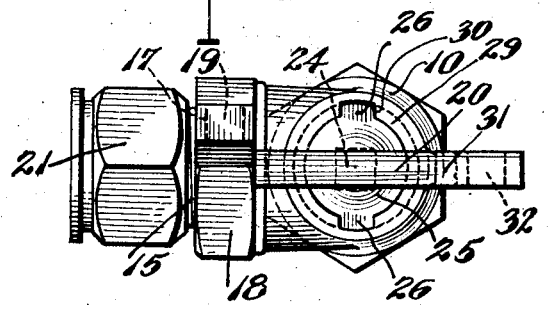
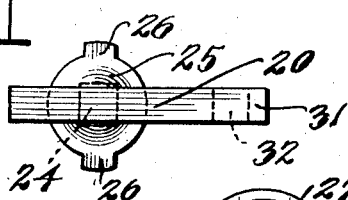
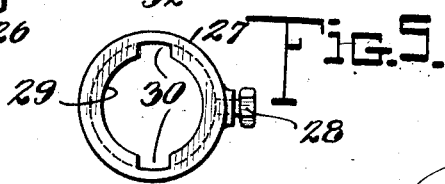
Inventor
L. C. Swacker
By Robb, Robb & Hill
Attorneys Jan. 18, 1927.
L. C. SWACKER
1,615,181
METER LOCK COCK
Filed July 31, 1925
2 Sheets-Sheet 2
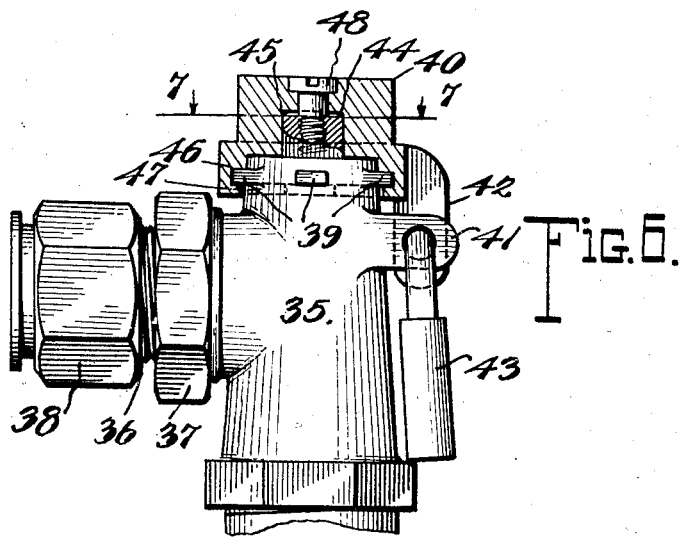
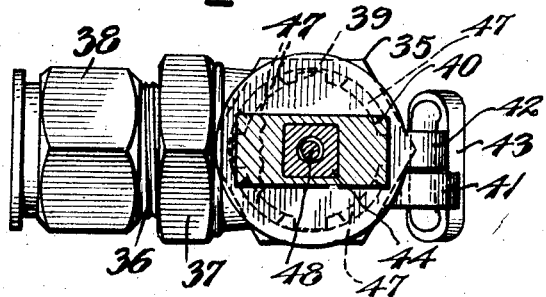
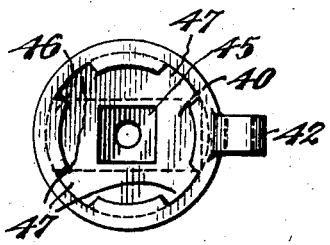
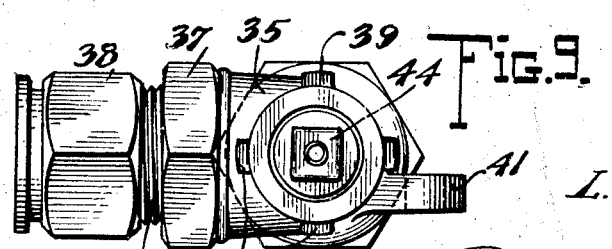
Inventor
L. C. Swacker Patented Jan. 18, 1927.

1,615,181

UNITED STATES PATENT OFFICE.

LEO CHARLES SWACKER, OF SOUTH CHARLESTON, WEST VIRGINIA.

METER LOCK COCK.

Application filed July 31, 1925. Serial No. 47,292.

This invention relates to a meter lock cock, and particularly to a construction in which the operating key is adapted to be locked in cut-off or closed position, to prevent unauthorized use of the meter or the fluid to be measured thereby.

In previous constructions various devices for accomplishing such locking have been used but they were not designed to position the locking key in definite relation to the discharge from the cock so that a fixed member upon the cock body could be used both as a determining stop and a cooperating locking means for the key.

Further, prior locking devices were not designed for use with meters of the water meter type which are usually located in a vertical pipe or tile and require a compact structure in order to render the key accessible from above the meter and avoid the necessity of reaching beneath or around the meter for the purpose of operating the controlling key.

The invention has for an object to provide a novel and improved construction wherein the body or casing of the meter cock is provided with a fixed stop lug and the cock member having a detachable key with a cooperating locking arm to engage said lug and be secured thereto by a locking device.

A further object of the invention is to present a new structure of cock body having a stop and locking lug thereon and retaining flanges disposed to cooperate with a key interlocked with said cock and having flanges to engage beneath those upon the body.

Another object of the invention is to provide a novel construction of cock comprising a body having a lateral discharge and an inverted hollow core member therein, together with a stop lug rigid with the discharge portion of the body and disposed parallel with the cock axis to cooperate with a locking key detachably connected to the cock.

Other and further objects and advantages of the invention will be hereinafter set forth and the novel features thereof defined by the appended claims.

In the drawings:

Figure 1 is an end elevation showing the parts in locked position;

Figure 2 is a vertical section with parts in elevation showing the cock in unlocked position;

Figure 3 is a top plan;

Figure 4 is a detail plan of the cock;

Figure 5 is a similar view of the retaining ring;

Figure 6 is an elevation of a modified form of the invention with the cap in section;

Figure 7 is a section on line 7—7 of Figure 6;

Figure 8 is a bottom plan of the cap; and

Figure 9 is a top plan of the cock with the cap removed.

Like reference numbers designate corresponding parts throughout the several figures of the drawing. The numeral 10 designates the cock body which may be of any desired size or configuration and is preferably formed with an inclined ground face 11 to receive an inverted tapering cock 12 open at its lower end 13 and having a discharge aperture 14 communicating with the lateral extension 15 from the cock body. This construction is particularly desirable since the pressure of the fluid within the cock causes it to at all times firmly engage the ground seat and effectually prevents leakage at that point. The cock body may also be provided at its lower portion with a threaded connection 16 for the usual service pipe, and the lateral discharge from the body is formed with an integral lug 17 having the connecting portion 18 provided with angular faces for the application of a tool. This stop 17 is formed with an aperture 19 by which the operating key 20 for the cock may be locked, as hereinafter described.

The extension 15 is also suitably threaded to receive a coupling nut 21 for the meter to which the cock is applied and thus provides for a close connection of the parts which will permit the location of the meter with the cock parallel thereto within a pipe or tile of the minimum diameter. The discharge connection 15 is also formed with the usual drain opening 22 to prevent freezing thereof when the cock is cut off.

In the form of the invention shown in Figures 1 to 5 the upper end of the cock is formed with an angular recess 23 adapted to receive a correspondingly shaped post 24 carried by the lower face of the key. This face preferably comprises a circular body 25 having at diametrically opposite points interlocking lugs 26 to cooperate with a guard or retaining ring 27 secured to the cock body in any desired manner, for instance by means of a set screw 28. This ring is formed with a horizontal flange 29 above the cock body which overlies the lugs 26 and this flange is formed at opposite points with recesses 30 to permit the introduction of these lugs into position beneath the flange. The key is also formed with a laterally extended arm 31 apertured at 32 to receive a suitable locking device such as 33 when the arm and stop are in abutting relation as shown in Figure 1. This mounting of the key permits its removal if desired when the cock is in either full open or closed position but retains the key in any intermediate position. This construction is particularly desirable if it be desired to lock the cock in open instead of closed position.

With the parts in the position shown in Figure 2, when the key and cock are swung to closed position the parts are in position for locking, but if it be desired to lock in open position the key is removed and reversed in position so that it can be locked to the fixed stop member.

In the modified form of the invention shown in Figures 6 to 9 the cock body 35 is substantially similar in construction to that before described and the lateral discharge extension 36 provided with a wrench hold 37 and coupling nut 38 threaded thereon for connection to the meter. The upper portion of the body in this form of the invention is formed with a series of radial lugs 39 to cooperate with and retain a cap key 40. The body is also formed with a fixed stop and lock member 41 extended laterally therefrom to cooperate with a locking arm 42 from the cap, these parts being secured when in engagement by a suitable lock such as shown at 43.

The cock used in this modification is of the hollow inverted type shown in Figure 2 and provided at its upper end with an angular post 44 adapted to seat in a corresponding recess 45 formed in the upper portion of the cap, the lower portion thereof being enlarged as at 46 to embrace the top of the body 35 and formed with inwardly extending flanges 47 adapted to engage beneath and interlock with the radial lugs 39. If desired the upper portion of the cap 40 may be formed angular as shown in Figure 7, for the application of a suitable wrench tool, and this portion of the cap also has extended therethrough an adjusting screw 48 entering the post 44 for the purpose of tightly retaining the several connected parts in position, and for taking up wear which would occur in long usage.

In this form of the invention the cap may likewise be locked when in either full open or closed position, as indicated by dotted lines in Figure 7 where the lugs and flange recesses are out of alignment. This arrangement permits the release of the cap and its reversal in position to lock the cock in open relation if found desirable, as above described.

The operation of the invention is substantially similar in both forms shown, as will be apparent from the foregoing description from which it will be seen that a fixed stop is provided upon the body at the top adapted to cooperate with the operating key for locking purposes, and that this key may be removed and adjusted in position to lock the cock in either of two relations.

The construction also presents a form where the operating key may be disposed directly at the side or top of the meter for accessibility which avoids the objection of reaching beneath the meter and also removes this key from a position where it is liable to become clogged by collected dirt in the pipe containing the meter or from corrosion owing to collected water in such a container.

While the details of the invention have been specifically shown and described, changes and alterations may be made therein without departing from the spirit of the invention as defined by the appended claims.

Having thus described my invention, what I claim as new and desire to secure by Letters Patent is:

1. In a meter lock cock, a body provided with a fixed stop lug having locking means, a cock member within the body having a detachable key with a post and socket operating connection for said member constructed to be reversed in position upon said member, and cooperating locking means upon the key disposed to engage said lug as a stop and adapted upon reversal of the key connection to be secured thereto when the cock is in either an open or closed position.

2. In a meter lock cock, a body having a lateral discharge, a turning cock within said body, a stop lug rigid with said discharge, and a key reversely connected by an angular post and socket for operating said cock and provided with an extended arm disposed to engage either face of said stop and adapted to be locked thereto.

3. In a meter lock cock, a body provided with a fixed stop lug having locking means, a cock member within the body having a detachable key with a post and socket operating connection for said member constructed to be reversed in position upon said member, cooperating locking means upon the key disposed to engage said lug as a stop and adapted upon reversal of the key connection to be secured thereto when the cock is in either an open or closed position, and an interlocking retaining flange and lug cooperatively disposed upon the body and key.

4. In a meter lock cock, a body provided with a fixed stop lug having locking means, a cock member within the body having a detachable key with a post and socket operating connection for said member constructed to be reversed in position upon said member, cooperating locking means upon the key disposed to engage said lug as a stop and adapted upon reversal of the key connection to be secured thereto when the cock is in either an open or closed position, a retaining flange secured to the body and provided with diametrically opposite openings, and radial lugs upon said key disposed to pass through said openings and travel beneath the flange.

In testimony whereof I affix my signature.

LEO CHARLES SWACKER.